US011335190B2

(12) United States Patent
Iwaki et al.

(10) Patent No.: US 11,335,190 B2
(45) Date of Patent: May 17, 2022

(54) STORAGE SYSTEM FOR VEHICLE

(71) Applicant: Yazaki Corporation, Tokyo (JP)

(72) Inventors: Takahiro Iwaki, Shizuoka (JP); You Yanagida, Shizuoka (JP)

(73) Assignee: YAZAKI CORPORATION, Tokyo (JP)

(*) Notice: Subject to any disclaimer, the term of this patent is extended or adjusted under 35 U.S.C. 154(b) by 246 days.

(21) Appl. No.: 16/790,639

(22) Filed: Feb. 13, 2020

(65) Prior Publication Data

US 2020/0302782 A1 Sep. 24, 2020

(30) Foreign Application Priority Data

Mar. 18, 2019 (JP) .............................. JP2019-049490

(51) Int. Cl.
| G08G 1/01 | (2006.01) |
| G06K 9/62 | (2022.01) |
| G06V 20/56 | (2022.01) |
| G07C 5/00 | (2006.01) |
| G07C 5/08 | (2006.01) |
| G08C 17/02 | (2006.01) |
| H04W 4/44 | (2018.01) |

(52) U.S. Cl.
CPC ......... *G08G 1/0133* (2013.01); *G06K 9/6267* (2013.01); *G06V 20/56* (2022.01); *G07C 5/008* (2013.01); *G07C 5/0841* (2013.01)

(58) Field of Classification Search
USPC ......................................................... 701/117
See application file for complete search history.

(56) References Cited

U.S. PATENT DOCUMENTS

| 9,247,040 | B1* | 1/2016 | Sutton ..................... H04W 4/40 |
| 10,035,514 | B1* | 7/2018 | Lambert ............... B60W 40/09 |
| 2015/0088335 | A1* | 3/2015 | Lambert ................. H04L 67/10 |
| | | | 701/1 |
| 2015/0287250 | A1* | 10/2015 | Niwa ...................... F16H 63/40 |
| | | | 701/51 |
| 2016/0150357 | A1* | 5/2016 | Jung ................. H04W 52/0206 |
| | | | 455/41.1 |

FOREIGN PATENT DOCUMENTS

| CN | 105128815 A | 12/2015 |
| CN | 107707633 A | 2/2018 |
| JP | 2014-96023 A | 5/2014 |
| JP | 2016-218824 A | 12/2016 |
| TR | 2017 07024 A2 | 11/2018 |
| WO | 2015/002026 A1 | 1/2015 |
| WO | 2019/112533 A2 | 6/2019 |

\* cited by examiner

*Primary Examiner* — Tyler D Paige
(74) *Attorney, Agent, or Firm* — Kenealy Vaidya LLP

(57) ABSTRACT

An acquisition unit acquires vehicle information related to a vehicle. An in-vehicle storage unit is provided in the vehicle and stores therein the vehicle information acquired by the acquisition unit. A transmission unit transmits the vehicle information acquired by the acquisition unit to an off-vehicle server located at an outside of the vehicle. A classification unit classifies the vehicle information acquired by the acquisition unit into information for transmission to be transmitted to the off-vehicle server or information for storage to be stored in the in-vehicle storage unit.

16 Claims, 2 Drawing Sheets

| | INFORMATION FOR TRANSMISSION TO BE TRANSMITTED TO OFF-VEHICLE SERVER | INFORMATION FOR STORAGE TO BE STORED IN IN-VEHICLE STORAGE UNIT |
|---|---|---|
| FIRST PATTERN | A | B |
| SECOND PATTERN | B | A |
| THIRD PATTERN | AB | B |
| FOURTH PATTERN | A | AB |
| FIFTH PATTERN | B | AB |
| SIXTH PATTERN | AB | A |
| SEVENTH PATTERN | AB | - |
| EIGHTH PATTERN | - | AB |
| NINTH PATTERN | AB | AB |
| TENTH PATTERN | A | A |
| ELEVENTH PATTERN | B | B |

STORAGE SYSTEM FOR VEHICLE

CROSS-REFERENCE TO RELATED APPLICATION(S)

The present application claims priority to and incorporates by reference the entire contents of Japanese Patent Application No. 2019-049490 filed in Japan on Mar. 18, 2019.

BACKGROUND OF THE INVENTION

1. Field of the Invention

The present invention relates to a storage system for a vehicle.

2. Description of the Related Art

In the related art, as a storage system for a vehicle, for example, Japanese Patent Application Laid-open No. 2014-096023 discloses a vehicle information storage device that is mounted on a vehicle and stores therein various types of information in order to investigate the cause of an accident. The vehicle information storage device stores therein, for example, operation information related to a shift operation, an acceleration operation, and the like of the vehicle and a travel state information related to a travel state of the vehicle.

In recent years, since information handled by a vehicle has been diversified, it is desired to be able to appropriately store information even in such a case.

SUMMARY OF THE INVENTION

Therefore, the present invention has been made in view of the above problems and an object of the present invention is to provide a storage system for a vehicle, capable of appropriately storing therein vehicle information related to the vehicle.

In order to achieve the above mentioned object, a storage system for a vehicle according to one aspect of the present invention includes an acquisition unit that acquires vehicle information related to a vehicle; an in-vehicle storage unit that is provided in the vehicle and stores therein the vehicle information acquired by the acquisition unit; a transmission unit that transmits the vehicle information acquired by the acquisition unit to an off-vehicle server located at an outside of the vehicle; and a classification unit that classifies the vehicle information acquired by the acquisition unit into information for transmission to be transmitted to the off-vehicle server or information for storage to be stored in the in-vehicle storage unit.

According to another aspect of the present invention, in the storage system for a vehicle, it is preferable that the acquisition unit includes a vehicle information acquisition section that acquires vehicle state information representing a state of the vehicle as the vehicle information and a personal information acquisition section that acquires, as the vehicle information, personal information related to an occupant in the vehicle, and the classification unit classifies the vehicle state information acquired by the vehicle information acquisition section into the information for transmission or the information for storage, and classifies the personal information acquired by the personal information acquisition section into the information for transmission or the information for storage.

According to still another aspect of the present invention, in the storage system for a vehicle, it is preferable that the classification unit classifies the vehicle state information into the information for storage, and classifies the personal information into the information for transmission.

According to still another aspect of the present invention, in the storage system for a vehicle, it is preferable that the classification unit changes a classification method for the vehicle information according to the state of the vehicle.

According to still another aspect of the present invention, in the storage system for a vehicle, it is possible to further include an information integration device that integrates the vehicle information, wherein the acquisition unit adds information for integration for integrating the acquired vehicle information to the vehicle information, and the information integration device integrates the vehicle information classified by the classification unit and transmitted to the off-vehicle server, and the vehicle information classified by the classification unit and stored in the in-vehicle storage unit, based on the information for integration.

According to still another aspect of the present invention, in the storage system for a vehicle, it is preferable that the classification unit does not store the vehicle information transmitted to the off-vehicle server by the transmission unit in a storage unit on a side of the vehicle.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

A mode (embodiment) for carrying out the present invention will be described in detail with reference to the drawings. It is noted that the present invention is not limited by the contents described in the following embodiment. Furthermore, components described below include those that can be easily conceived of by a person skilled in the art or those that are substantially the same. Moreover, configurations described below can be combined as appropriate. Furthermore, various omissions, replacements, or changes in the configurations can be made without departing from the scope of the present invention.

Embodiment

Figure 1:
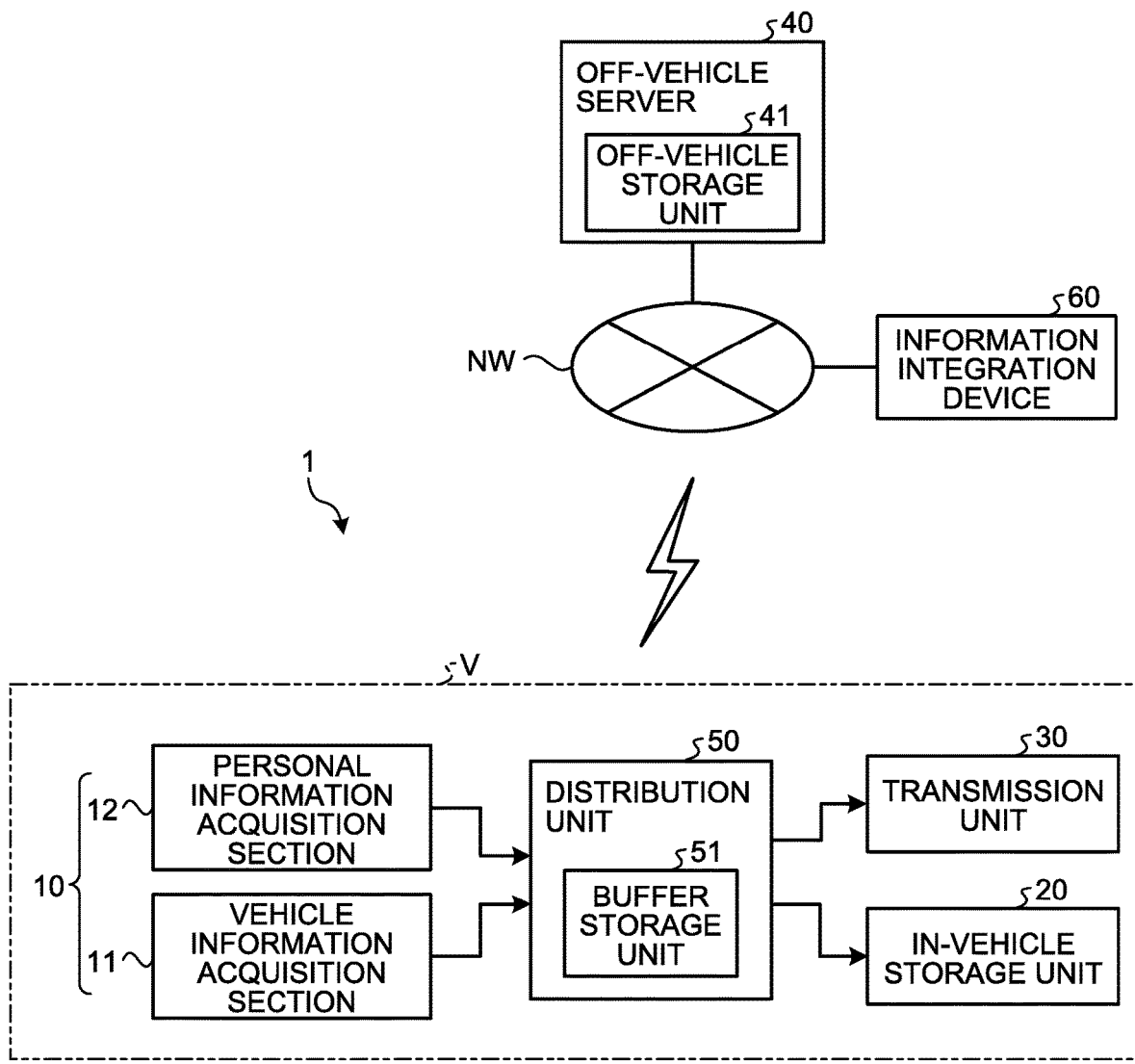
FIG. 1 is a block diagram illustrating a configuration example of a storage system for a vehicle according to an embodiment.

With reference to the drawings, a storage system 1 for a vehicle according to an embodiment will be described. FIG. 1 is a block diagram illustrating a configuration example of the storage system 1 for a vehicle according to the embodiment. The storage system 1 for a vehicle is a system that stores therein vehicle information related to a vehicle V. As illustrated in FIG. 1, the storage system 1 for a vehicle includes an acquisition unit 10, an in-vehicle storage unit 20, a transmission unit 30, an off-vehicle server 40, a classification unit 50, and an information integration device 60.

The acquisition unit 10 acquires information. The acquisition unit 10 is mounted on the vehicle V, for example, and acquires vehicle information related to the vehicle V. The acquisition unit 10 includes a vehicle information acquisition section 11 and a personal information acquisition section 12. The vehicle information acquisition section 11 acquires vehicle state information representing the state of the vehicle V as the vehicle information. The vehicle state information includes, for example, a speed, an acceleration, and a steering angle of the vehicle V, an accelerator pedal operation amount (accelerator stepping amount), a brake pedal operation amount (brake stepping amount), the presence or absence of an operation and an indication direction of a direction indicator (winker), a seat belt wearing state, image information and sound information around the vehicle V, external object information around the vehicle V, current position information (GPS information) of the vehicle V, and the like. In order to detect the above information, the vehicle information acquisition section 11 includes a speed sensor, an acceleration sensor, a steering angle sensor, an accelerator sensor, a brake sensor, a winker switch, a seat belt detector, an imaging device such as a CCD camera and a sound collection device, and various detectors such as various radars, sonars, and GPS receivers. The vehicle information acquisition section 11 is connected to the classification unit 50 and outputs the acquired vehicle state information to the classification unit 50. At this time, the vehicle information acquisition section 11 outputs an acquisition date and time of the vehicle state information and a unique vehicle identification (ID) for identifying the vehicle V to the classification unit 50 in association with the vehicle state information. The vehicle identification (ID) and the acquisition date and time are examples of information for integration.

The personal information acquisition section 12 acquires, as the vehicle information, personal information related to an occupant in the vehicle V. The occupant of the vehicle V includes a driver who drives the vehicle V and a passenger in the vehicle V together with the driver. The personal information includes identification information (an address, a name, a telephone number, and the like) for identifying the occupant, biometric information related to the living body of the occupant, and the like. The biometric information includes various types of physiological information emitted by the living body (occupant) and various types of information derived from these pieces of the information. The biometric information includes, for example, vital signs, such as electrocardiogram information, a heart rate, a respiratory rate, a pulse rate, blood pressure, body temperature, brain waves, and a muscle current, individual identification information capable of identifying an individual, such as fingerprint information, vein information, facial information, voiceprint information, and iris information, blood alcohol concentration, line-of-sight information, a sleep time as derivative information estimated based on these pieces of the information, and the like. In order to detect the above information, the personal information acquisition section 12 includes various detectors such as a blood pressure sensor, an electrocardiogram sensor, a heart rate sensor, a respiratory sensor, a pulse sensor, a blood pressure sensor, a body temperature sensor, a brain wave sensor, a muscle current sensor, and various individual identification information sensors. The personal information acquisition section 12 is connected to the classification unit 50 and outputs the acquired personal information to the classification unit 50. At this time, the personal information acquisition section 12 outputs an acquisition date and time of the personal information and the unique vehicle identification (ID) for identifying the vehicle V to the classification unit 50 in association with the personal information.

The in-vehicle storage unit 20 is provided in the vehicle V to store therein information. For example, the in-vehicle storage unit 20 has a function of a storage unit called an event data recorder (EDR) that records the brake pedal operation amount, the seat belt wearing state, and the like, or a dashboard camera that records the image information, sound information, and the like around the vehicle V. The in-vehicle storage unit 20 is composed of a hard disk, a solid state drive (SSD), an optical disc, and the like, for example. The in-vehicle storage unit 20 may constitute what is called a black box that is mounted in the vicinity of the position of the center of gravity in the vehicle V and is firmly protected against a strong impact and the like. In such a case, preferably, electric power is supplied to the in-vehicle storage unit 20 in a non-contact manner; however, the present invention is not limited thereto.

The in-vehicle storage unit 20 is wirelessly connected to the classification unit 50, for example. The in-vehicle storage unit 20 receives vehicle information classified and wirelessly transmitted by the classification unit 50, and stores therein the received vehicle information. The in-vehicle storage unit 20 stores therein, for example, the vehicle state information acquired by the vehicle information acquisition section 11 and classified by the classification unit 50, the acquisition date and time of the vehicle state information, and the vehicle identification (ID) of the vehicle V. Furthermore, the in-vehicle storage unit 20 stores therein the personal information acquired by the personal information acquisition section 12 and classified by the classification unit 50, the acquisition date and time of the personal information, and the vehicle identification (ID) of the vehicle V.

The transmission unit 30 wirelessly transmits information. The transmission unit 30 is connected to the classification unit 50 and transmits the vehicle information classified by the classification unit 50 to the off-vehicle server 40. The transmission unit 30 encrypts, for example, the vehicle state information acquired by the vehicle information acquisition section 11 and classified by the classification unit 50, the acquisition date and time of the vehicle state information, and the vehicle identification (ID) of the vehicle V, and transmits the encrypted information to the off-vehicle server 40. Furthermore, the transmission unit 30 encrypts, for example, the personal information acquired by the personal information acquisition section 12 and classified by the classification unit 50, the acquisition date and time of the personal information, and the vehicle identification (ID) of the vehicle V, and transmits the encrypted information to the off-vehicle server 40.

The off-vehicle server 40 processes information. The off-vehicle server 40 is located at an outside of the vehicle V and is connected to a communication network NW. The off-vehicle server 40 transmits and receives information via the communication network NW. The off-vehicle server 40 receives, for example, the vehicle state information, the acquisition date and time of the vehicle state information, and the vehicle identification (ID) of the vehicle V, which are transmitted from the transmission unit 30, via the communication network NW, and decrypts the received information. Furthermore, the off-vehicle server 40 receives the personal information, the acquisition date and time of the personal information, and the vehicle identification (ID) of the vehicle V, which are transmitted from the transmission unit 30, via the communication network NW, and decrypts the received information.

The off-vehicle server 40 includes an off-vehicle storage unit 41 that stores therein information. The off-vehicle storage unit 41 is composed of a hard disk, an SSD, an optical disc, and the like, for example. The off-vehicle storage unit 41 stores therein the decrypted vehicle state information, acquisition date and time of the vehicle state information, and vehicle identification (ID) of the vehicle V. Furthermore, the off-vehicle storage unit 41 stores therein the decrypted personal information, acquisition date and time of the personal information, and vehicle identification (ID) of the vehicle V.

The classification unit 50 classifies information. The classification unit 50 includes a buffer storage unit 51 as a storage unit. The classification unit 50 is connected to the acquisition unit 10 and temporarily stores the vehicle information (the vehicle state information and the personal information), which was output from the acquisition unit 10, in the buffer storage unit 51. The classification unit 50 classifies the vehicle information stored in the buffer storage unit 51 into information for transmission to be transmitted to the off-vehicle server 40 or information for storage to be stored in the in-vehicle storage unit 20 of the vehicle V. In such a case, the classification unit 50 first determines each piece of the information. For example, the classification unit 50 determines the vehicle state information and the personal information based on an output source of information. For example, when information is output from the vehicle information acquisition section 11, the classification unit 50 determines that the information is the vehicle state information, and when information is output from the personal information acquisition section 12, the classification unit 50 determines that the information is the personal information. The classification unit 50 may determine each piece of the information based on an information identification (ID) and the like for identifying the vehicle state information and the personal information.

Next, the classification unit 50 classifies the determined information. The classification unit 50 has a classification table for classifying the information. The classification table describes which information is classified as information to be output to which target. For example, the classification table describes that the vehicle state information is classified as information for storage to be stored in the in-vehicle storage unit 20 of the vehicle V and the personal information is classified as information for transmission to be transmitted to the off-vehicle server 40. The classification unit 50 classifies each piece of the information with reference to the classification table. For example, the classification unit 50 classifies the vehicle state information into the information for storage to be stored in the in-vehicle storage unit 20 of the vehicle V and classifies the personal information into the information for transmission to be transmitted to the off-vehicle server 40. Then, the classification unit 50 wirelessly transmits the vehicle state information, which was output from the vehicle information acquisition section 11, to the in-vehicle storage unit 20, and outputs the personal information, which was output from the personal information acquisition section 12, to the transmission unit 30.

The classification unit 50 does not store the vehicle information (personal information) transmitted to the off-vehicle server 40 by the transmission unit 30 in the buffer storage unit 51 of the vehicle V. For example, the classification unit 50 deletes the personal information stored in the buffer storage unit 51 after the transmission unit 30 transmits the personal information of the buffer storage unit 51 to the off-vehicle server 40.

The information integration device 60 integrates a plurality of types of information. The information integration device 60 is located at an outside of the vehicle V and connected to the communication network NW. The information integration device 60 is installed, for example, in a trader, (what is called a dealer) who performs repair, inspection, and the like of the vehicle V. The information integration device 60 integrates the vehicle information classified by the classification unit 50, as necessary. For example, when accident verification of the vehicle V is performed, the information integration device 60 integrates the vehicle state information stored in the in-vehicle storage unit 20 of the vehicle V and the personal information stored in the off-vehicle storage unit 41 of the off-vehicle server 40. When integrating each piece of the information, the information integration device 60 extracts the vehicle state information of the vehicle V, which is subjected to accident verification, from the in-vehicle storage unit 20 of the vehicle V based on the vehicle identification (ID). Furthermore, the information integration device 60 extracts the personal information of the vehicle V, which is subjected to the accident verification, from the off-vehicle storage unit 41 of the off-vehicle server 40 based on the vehicle identification (ID). Then, the information integration device 60 chronologically arranges the vehicle state information extracted from the in-vehicle storage unit 20 of the vehicle V and the personal information extracted from the off-vehicle storage unit 41 of the off-vehicle server 40, based on the corresponding acquisition dates and times. In this way, the information integration device 60 can match the state of the vehicle V represented by the vehicle state information and the state of the occupant of the vehicle V represented by the personal information at the time at which the accident of the vehicle V has occurred.

Figures 2, 3:
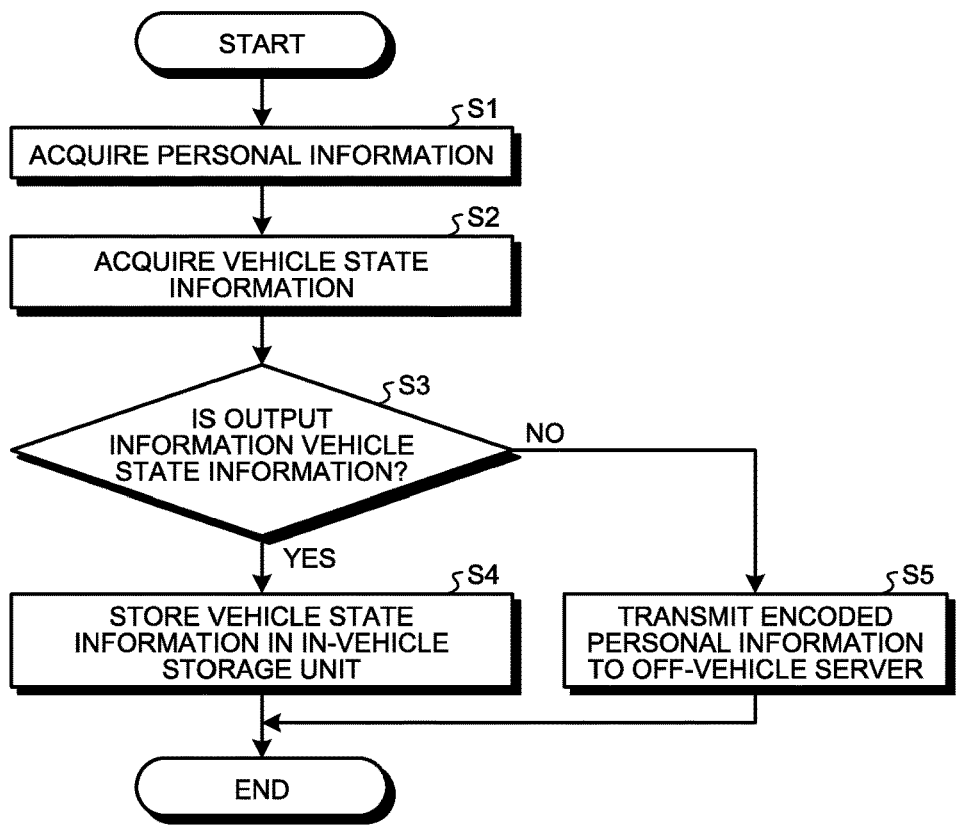
FIG. 2 is a flowchart illustrating an operation example of the storage system for a vehicle according to the embodiment.
FIG. 3 is a diagram illustrating classification patterns of vehicle information according to the embodiment.

Next, an operation example of the storage system 1 for a vehicle will be described. FIG. 2 is a flowchart illustrating an operation example of the storage system 1 for a vehicle according to the embodiment. In the storage system 1 for a vehicle, the personal information acquisition section 12 acquires the personal information of the occupant of the vehicle V (step S1) and outputs the acquired personal information to the classification unit 50 as illustrated in FIG. 2. Next, the vehicle information acquisition section 11 acquires the vehicle state information representing the state of the vehicle V (step S2) and outputs the acquired vehicle state information to the classification unit 50. Next, the classification unit 50 determines whether the output information is vehicle state information (step S3). When the output information is the vehicle state information (Yes at step S3), the classification unit 50 classifies the vehicle state information, which was output from the vehicle information acquisition section 11, into the information for storage to be stored in the in-vehicle storage unit 20, and outputs the classified vehicle state information to the in-vehicle storage unit 20. The in-vehicle storage unit 20 stores therein the vehicle state information output from the classification unit 50 (step S4). On the other hand, when the output information is personal information (No at step S3), the classification unit 50 classifies the personal information, which was output from the personal information acquisition section 12, into the information for transmission to be transmitted to the off-vehicle server 40, and outputs the classified personal information to the transmission unit 30. The transmission unit 30 encrypts the personal information output from the classification unit 50 and transmits the encrypted personal information to the off-vehicle server 40 (step S5).

As described above, the storage system 1 for a vehicle according to the embodiment includes the acquisition unit 10, the in-vehicle storage unit 20, the transmission unit 30, and the classification unit 50. The acquisition unit 10 acquires the vehicle information related to the vehicle V. The in-vehicle storage unit 20 is provided in the vehicle V and stores therein the vehicle information acquired by the acquisition unit 10. The transmission unit 30 transmits the vehicle information acquired by the acquisition unit 10 to the off-vehicle server 40 located at an outside of the vehicle V. The classification unit 50 classifies the vehicle information acquired by the acquisition unit 10 into the information for transmission to be transmitted to the off-vehicle server 40 or the information for storage to be stored in the in-vehicle storage unit 20. With such a configuration, the storage system 1 for a vehicle can appropriately store therein vehicle information even when information handled by the vehicle V is diversified.

In the storage system 1 for a vehicle, the acquisition unit 10 includes the vehicle information acquisition section 11 and the personal information acquisition section 12. The vehicle information acquisition section 11 acquires the vehicle state information representing the state of the vehicle V as the vehicle information. The personal information acquisition section 12 acquires, as the vehicle information, the personal information related to the occupant in the vehicle V. The classification unit 50 classifies the vehicle state information acquired by the vehicle information acquisition section 11 to the information for storage to be stored in the in-vehicle storage unit 20 or the information for transmission to be transmitted to the off-vehicle server 40. Furthermore, the classification unit 50 classifies the personal information acquired by the personal information acquisition section 12 into the information for storage to be stored in the in-vehicle storage unit 20 or the information for transmission to be transmitted to the off-vehicle server 40.

With such a configuration, the storage system 1 for a vehicle can store the vehicle state information and the personal information in different storage units, respectively. In this way, the storage system 1 for a vehicle can store therein the vehicle state information and the personal information in a classified manner, so that it is possible to appropriately ensure information security.

In the storage system 1 for a vehicle, the classification unit 50 classifies the personal information into the information for transmission to be transmitted to the off-vehicle server 40 and classifies the vehicle state information into the information for storage to be stored in the in-vehicle storage unit 20. With such a configuration, since the storage system 1 for a vehicle can store the personal information in the off-vehicle server 40, when the vehicle V is shared with others, for example, the personal information of the occupant can be prevented from being leaked to the others.

The storage system 1 for a vehicle includes the information integration device 60 that integrates the vehicle information. The acquisition unit 10 adds information for integration (vehicle identification (ID) and acquisition date and time) for integrating the acquired vehicle information to the vehicle information. The information integration device 60 integrates the vehicle information (personal information) classified by the distribution unit 50 and transmitted to the off-vehicle server 40, and the vehicle information (vehicle state information) classified by the classification unit 50 and stored in the in-vehicle storage unit 20, based on the information for integration (vehicle identification (ID) and acquisition date and time).

With such a configuration, for example, the storage system 1 for a vehicle may match the state of the vehicle V represented by the vehicle state information and the state of the occupant of the vehicle V represented by the personal information at the time at which the accident of the vehicle V has occurred. In this way, an accident verifier can appropriately grasp the state of the vehicle V and the state of the occupant when verifying the accident of the vehicle V. For example, when the vehicle V has an autonomous driving function, the accident verifier can appropriately determine whether the cause of the accident is due to the autonomous driving function or a driver.

In the storage system 1 for a vehicle, the classification unit 50 does not store the vehicle information transmitted to the off-vehicle server 40 by the transmission unit 30 in the buffer storage unit 51 of the vehicle V. With such a configuration, for example, the storage system 1 for a vehicle can prevent the personal information from being left in the storage unit on the vehicle V side, so that it is possible to reliably restrain the personal information from being leaked to others.

Modified Example

Next, a modified example of the embodiment will be described. The classification unit 50 may change the classification method for the vehicle information according to the state of the vehicle V. For example, when a collision accident and the like of the vehicle V have not been detected by an accident detection unit (not illustrated) that detects an accident, the classification unit 50 classifies the vehicle state information into the information for storage to be stored in the in-vehicle storage unit 20 of the vehicle V and classifies the personal information into the information for transmission to be transmitted to the off-vehicle server 40, as described above. On the other hand, when the collision accident and the like of the vehicle V have been detected by the accident detection unit, the classification unit 50 classifies both the personal information and the vehicle state information into the information for transmission to be transmitted to the off-vehicle server 40. The classification unit 50, for example, classifies the vehicle state information stored in the in-vehicle storage unit 20 into the information for transmission between a predetermined time before the time at which the collision accident and the like of the vehicle V have been detected and the accident detection time, and outputs the vehicle state information classified to the information for transmission to the transmission unit 30. The transmission unit 30 transmits the vehicle state information classified by the classification unit 50 to the off-vehicle server 40.

The off-vehicle server 40 stores the vehicle state information transmitted from the transmission unit 30 of the vehicle V in the off-vehicle storage unit 41. Based on the vehicle identification (ID), the information integration device 60 extracts the personal information and the vehicle state information of the vehicle V, which is subjected to accident verification, from the off-vehicle storage unit 41 of the off-vehicle server 40. Then, the information integration device 60 chronologically arranges the personal information and the vehicle state information, which are extracted from the off-vehicle storage unit 41 of the off-vehicle server 40, based on the corresponding acquisition dates and times, and matches the state of the vehicle V represented by the vehicle state information and the state of the occupant of the vehicle V represented by the personal information at the time at which the accident of the vehicle V has occurred. As described above, in the storage system 1 for a vehicle, the classification unit 50 changes the classification method for the vehicle information (the personal information and the vehicle state information) according to the state of the vehicle V. With such a configuration, the storage system 1 for a vehicle can store both the vehicle state information and the personal information of the vehicle V, which is subjected to the accident verification, in the off-vehicle storage unit 41 of the off-vehicle server 40, thereby quickly providing information when performing the accident verification.

Although the above description has described an example in which the classification unit 50 classifies the vehicle state information into the information for storage to be stored in the in-vehicle storage unit 20 of the vehicle V and classifies the personal information into the information for transmission to be transmitted to the off-vehicle server 40, the present invention is not limited thereto. For example, the classification unit 50 may classify the vehicle state information acquired by the vehicle information acquisition section 11 into the information for transmission to be transmitted to the off-vehicle server 40 and classify the personal information acquired by the personal information acquisition section 12 into the information for storage to be stored in the in-vehicle storage unit 20 of the vehicle V. With such a configuration, a traffic system (not illustrated) for providing traffic congestion information and the like can acquire the vehicle state information, which is stored in the off-vehicle storage unit 41 of the off-vehicle server 40, as probe information via the communication network NW. In this way, based on the probe information acquired in real time, the traffic system can provide traffic congestion mitigation, driving support of the vehicle V, traffic management, risk prediction, traffic accident reduction, insurance services, and the like.

Although the above description has described an example in which the classification unit 50 does not store the vehicle information (personal information) transmitted to the off-vehicle server 40 by the transmission unit 30 in the buffer storage unit 51 of the vehicle V, the present invention is not limited thereto. The classification unit 50 may leave the vehicle information (personal information) transmitted to the off-vehicle server 40 by the transmission unit 30 in the buffer storage unit 51 of the vehicle V.

The classification unit 50 may perform the classification by other classification methods as well as the aforementioned information classification method. FIG. 3 is a diagram illustrating classification patterns of the vehicle information according to the embodiment. FIG. 3 illustrates a first pattern to an eleventh pattern for classifying the vehicle information. In FIG. 3, the letter "A" represents the personal information and the letter "B" represents the vehicle state information. The first pattern illustrated in FIG. 3 is a pattern in which the vehicle state information "B" acquired by the vehicle information acquisition section 11 is classified to the information for storage to be stored in the in-vehicle storage unit 20 of the vehicle V and the personal information "A" acquired by the personal information acquisition section 12 is classified to the information for transmission to be transmitted to the off-vehicle server 40, as described above.

The second pattern is a pattern in which the vehicle state information "B" acquired by the vehicle information acquisition section 11 is classified to the information for transmission to be transmitted to the off-vehicle server 40 and the personal information "A" acquired by the personal information acquisition section 12 is classified to the information for storage to be stored in the in-vehicle storage unit 20 of the vehicle V, as described above.

The third pattern is a pattern in which the vehicle state information "B" acquired by the vehicle information acquisition section 11 is classified to the information for storage to be stored in the in-vehicle storage unit 20 of the vehicle V and the personal information "A" acquired by the personal information acquisition section 12 is classified to the information for transmission to be transmitted to the off-vehicle server 40, as described above. Moreover, in the third pattern, for example, when a collision accident and the like of the vehicle V have been detected, the vehicle state information "B" relevant to the collision accident is also classified to the information for transmission to be transmitted to the off-vehicle server 40.

The fourth pattern is a pattern in which the vehicle state information "B" acquired by the vehicle information acquisition section 11 is classified to the information for storage to be stored in the in-vehicle storage unit 20 of the vehicle V and the personal information "A" acquired by the personal information acquisition section 12 is classified to the information for transmission to be transmitted to the off-vehicle server 40. Moreover, in the fourth pattern, the personal information "A" is classified to the information for storage to be stored in the in-vehicle storage unit 20, as necessary.

The fifth pattern is a pattern in which the vehicle state information "B" acquired by the vehicle information acquisition section 11 is classified to the information for transmission to be transmitted to the off-vehicle server 40 and the personal information "A" acquired by the personal information acquisition section 12 is classified to the information for storage to be stored in the in-vehicle storage unit 20 of the vehicle V. Moreover, in the fifth pattern, the vehicle state information "B" is classified to the information for storage to be stored in the in-vehicle storage unit 20, as necessary.

The sixth pattern is a pattern in which the vehicle state information "B" acquired by the vehicle information acquisition section 11 is classified to the information for transmission to be transmitted to the off-vehicle server 40 and the personal information "A" acquired by the personal information acquisition section 12 is classified to the information for storage to be stored in the in-vehicle storage unit 20 of the vehicle V. Moreover, in the sixth pattern, the personal information "A" is classified to the information for transmission to be transmitted to the off-vehicle server 40, as necessary.

The seventh pattern is a pattern in which the vehicle state information "B" acquired by the vehicle information acquisition section 11 is classified to the information for transmission to be transmitted to the off-vehicle server 40 and the personal information "A" acquired by the personal information acquisition section 12 is classified to the information for transmission to be transmitted to the off-vehicle server 40.

The eighth pattern is a pattern in which the vehicle state information "B" acquired by the vehicle information acquisition section 11 is classified to the information for storage to be stored in the in-vehicle storage unit 20 of the vehicle V and the personal information "A" acquired by the personal information acquisition section 12 is classified to the information for storage to be stored in the in-vehicle storage unit 20 of the vehicle V.

The ninth pattern is a pattern in which the vehicle state information "B" acquired by the vehicle information acquisition section 11 is classified to the information for storage to be stored in the in-vehicle storage unit 20 of the vehicle V and the information for transmission to be transmitted to the off-vehicle server 40 and the personal information "A"

acquired by the personal information acquisition section 12 is classified to the information for storage to be stored in the in-vehicle storage unit 20 of the vehicle V and the information for transmission to be transmitted to the off-vehicle server 40.

The tenth pattern is a pattern in which the personal information "A" acquired by the personal information acquisition section 12 is classified to the information for storage to be stored in the in-vehicle storage unit 20 of the vehicle V and the information for transmission to be transmitted to the off-vehicle server 40 and the vehicle state information "B" acquired by the vehicle information acquisition section 11 is not classified to the information for storage to be stored in the in-vehicle storage unit 20 of the vehicle V and the information for transmission to be transmitted to the off-vehicle server 40.

The eleventh pattern is a pattern in which the vehicle state information "B" acquired by the vehicle information acquisition section 11 is classified to the information for storage to be stored in the in-vehicle storage unit 20 of the vehicle V and the information for transmission to be transmitted to the off-vehicle server 40 and the personal information "A" acquired by the personal information acquisition section 12 is not classified to the information for storage to be stored in the in-vehicle storage unit 20 of the vehicle V and the information for transmission to be transmitted to the off-vehicle server 40.

Although the above description has described an example in which the vehicle information related to the vehicle V includes the vehicle state information and the personal information, the vehicle information is not limited to these pieces of the information and may include other types of information.

Since the storage system for a vehicle according to the embodiment includes the classification unit that classifies the vehicle information acquired by the acquisition section into information for transmission to be transmitted to the off-vehicle server or information for storage to be stored in the in-vehicle storage unit, it is possible to appropriately store vehicle information related to the vehicle in the storage system.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A storage system for a vehicle, comprising:
   an acquisition unit that acquires vehicle information related to a vehicle;
   an in-vehicle storage unit that is provided in the vehicle and stores therein the vehicle information acquired by the acquisition unit;
   a transmission unit that transmits the vehicle information acquired by the acquisition unit to an off-vehicle server located at an outside of the vehicle;
   a classification unit that classifies the vehicle information acquired by the acquisition unit into information for transmission to be transmitted to the off-vehicle server or information for storage to be stored in the in-vehicle storage unit; and
   an accident detection unit that detects an accident, wherein
   the acquisition unit includes a vehicle information acquisition section that acquires vehicle state information representing a state of the vehicle as the vehicle information and a personal information acquisition section that acquires, as the vehicle information, personal information related to an occupant in the vehicle, the vehicle state information including a speed, an acceleration, and a steering angle of the vehicle, the personal information including identification information for identifying the occupant, and
   when the accident detection unit does not detect the accident, the classification unit classifies the vehicle state information acquired by the vehicle information acquisition section into the information for storage, and classifies the personal information acquired by the personal information acquisition section into the information for transmission.

2. The storage system for a vehicle according to claim 1, wherein
   when the accident detection unit detects the accident, the classification unit classifies the vehicle state information acquired by the vehicle information acquisition section and the personal information acquired by the personal information acquisition section into the information for transmission.

3. The storage system for a vehicle according to claim 2, wherein
   the classification unit changes a classification method for the vehicle information according to the state of the vehicle.

4. The storage system for a vehicle according to claim 3, further comprising:
   an information integration device that integrates the vehicle information, wherein
   the acquisition unit adds information for integration for integrating the acquired vehicle information to the vehicle information, and
   the information integration device integrates the vehicle information classified by the classification unit and transmitted to the off-vehicle server, and the vehicle information classified by the classification unit and stored in the in-vehicle storage unit by arranging chronologically based on the corresponding acquisition dates and times.

5. The storage system for a vehicle according to claim 4, wherein
   the classification unit does not store the vehicle information transmitted to the off-vehicle server by the transmission unit in a storage unit on a side of the vehicle.

6. The storage system for a vehicle according to claim 3, wherein
   the classification unit does not store the vehicle information transmitted to the off-vehicle server by the transmission unit in a storage unit on a side of the vehicle.

7. The storage system for a vehicle according to claim 2, further comprising:
   an information integration device that integrates the vehicle information, wherein
   the acquisition unit adds information for integration for integrating the acquired vehicle information to the vehicle information, and
   the information integration device integrates the vehicle information classified by the classification unit and transmitted to the off-vehicle server, and the vehicle information classified by the classification unit and stored in the in-vehicle storage unit by arranging chronologically based on the corresponding acquisition dates and times.

8. The storage system for a vehicle according to claim 7, wherein
the classification unit does not store the vehicle information transmitted to the off-vehicle server by the transmission unit in a storage unit on a side of the vehicle.

9. The storage system for a vehicle according to claim 2, wherein
the classification unit does not store the vehicle information transmitted to the off-vehicle server by the transmission unit in a storage unit on a side of the vehicle.

10. The storage system for a vehicle according to claim 1, wherein
the classification unit changes a classification method for the vehicle information according to the state of the vehicle.

11. The storage system for a vehicle according to claim 10, further comprising:
an information integration device that integrates the vehicle information, wherein
the acquisition unit adds information for integration for integrating the acquired vehicle information to the vehicle information, and
the information integration device integrates the vehicle information classified by the classification unit and transmitted to the off-vehicle server, and the vehicle information classified by the classification unit and stored in the in-vehicle storage unit by arranging chronologically based on the corresponding acquisition dates and times.

12. The storage system for a vehicle according to claim 11, wherein
the classification unit does not store the vehicle information transmitted to the off-vehicle server by the transmission unit in a storage unit on a side of the vehicle.

13. The storage system for a vehicle according to claim 10, wherein
the classification unit does not store the vehicle information transmitted to the off-vehicle server by the transmission unit in a storage unit on a side of the vehicle.

14. The storage system for a vehicle according to claim 1, further comprising:
an information integration device that integrates the vehicle information, wherein
the acquisition unit adds information for integration for integrating the acquired vehicle information to the vehicle information, and
the information integration device integrates the vehicle information classified by the classification unit and transmitted to the off-vehicle server, and the vehicle information classified by the classification unit and stored in the in-vehicle storage unit by arranging chronologically based on the corresponding acquisition dates and times.

15. The storage system for a vehicle according to claim 14, wherein
the classification unit does not store the vehicle information transmitted to the off-vehicle server by the transmission unit in a storage unit on a side of the vehicle.

16. The storage system for a vehicle according to claim 1, wherein
the classification unit does not store the vehicle information transmitted to the off-vehicle server by the transmission unit in a storage unit on a side of the vehicle.

* * * * *